United States Patent [19]

Wilson

[11] Patent Number: 5,193,941
[45] Date of Patent: Mar. 16, 1993

[54] GROUT AND METHOD OF DISTRIBUTING ALUMINUM THEREIN

[75] Inventor: Alfonzo L. Wilson, Cleveland Heights, Ohio

[73] Assignee: Specrete-IP Incorporated, Cleveland, Ohio

[21] Appl. No.: 736,523

[22] Filed: Jul. 26, 1991

Related U.S. Application Data

[63] Continuation-in-part of Ser. No. 620,148, Nov. 30, 1990, Pat. No. 5,118,527, which is a continuation of Ser. No. 104,226, Oct. 5, 1987, abandoned.

[51] Int. Cl.⁵ .......................... E02D 3/12; C04B 22/04
[52] U.S. Cl. .................................... 405/266; 405/263; 405/267; 106/641; 106/814

[58] Field of Search ............... 427/203, 204, 205, 216; 106/403, 404, 641, 814; 428/403, 404, 406; 405/266, 267

[56] References Cited

U.S. PATENT DOCUMENTS

3,649,317  3/1972  Houseknecht ..................... 106/657
4,621,024  11/1986  Wright ............................... 428/404

*Primary Examiner*—William R. Dixon, Jr.
*Assistant Examiner*—Anthony J. Green

[57] ABSTRACT

Aluminum leafing flakes for expanding grout are adhered to microparticles to distribute the flakes in dry and wet grouts. The flakes have a protective coating sensitive to the alkalinity of dry and wet grouts alkaline. The coated flake carrying microparticles may be blended and stored with dry grouts or used directly with wet grouts as part of a fluidifier for the grout.

2 Claims, No Drawings

GROUT AND METHOD OF DISTRIBUTING ALUMINUM THEREIN

This application is a continuation-in-part of my earlier filed co-pending application Ser. No. 620,148 filed Nov. 30, 1990 U.S. Pat. No. 5,118,527 which is in turn a continuation of my application Ser. No. 104,226, filed Oct. 5, 1987 abandoned.

The present invention relates to grouting utilizing cementitious material, or materials, finely divided aluminum powder and water, without or with fine aggregate or admixtures, to produce a pumpable wet grout, and, more particularly, to a packaged blended dry grout comprising cementitious material, such as cement, blended together with protected aluminum flakes, with or without other materials such as sand, and to the type of aluminum flake product used therein.

As stated in my previous applications identified above, various practices have been previously used to introduce finely divided aluminum into a wet grout. The aluminum particles react with the alkaline water of the wet group to function as an expanding agent for the grout.

One such previous practice has been to mix at the jobsite about 3 to 5 grams of commercially available polished aluminum powder, such as leafing flakes used as pigments for paints, with about fifty lbs. of cement at the jobsite (to achieve dispersion); then this was added to more cement, and usually other materials, plus water to obtain a pumpable or pourable grout. This procedure is frowned upon in practice in that it is difficult to obtain the correct proportions and dispersion of the aluminum flakes. One known abortive effort to factory package blended aluminum flakes as commercially available and cement for mixing with water at the jobsite was given up within a matter of weeks because of the reaction of aluminum flakes in the package caused by the presence of the cement and the moisture in the blended dry mix.

Grout fluidifiers to be mixed at the jobsite with cement, water, and perhaps other materials, have involved the factory blending of the aluminum flakes with a non-alkaline powder, such as fly ash or limestone dust and/or other grout property-enhancing materials, with the blended materials being packaged in accurate amounts by weight for use with a stated quantity of cementitious materials at the jobsite.

Also as stated in the applications identified above, a prior and continuing commercial practice, is based on U.S. Pat. No. 3,197,323 and U.S. Pat. No. 3,579,366 to Solomon J. Rehar, involving preparing a dry grout including a cementitious material (frequently a portland cement), a fluidifier comprising commercially available polished 100 mesh aluminum flakes of the leafing type, and other materials, often a fine aggregate (sand in common practice), and packaging the blend for storage and shipment to a construction site where it is mixed with water to form a pumpable wet grout for use in filling a construction form or other space to form a hardened grout structure. Before the aluminum flakes are blended with the cement of the dry grout, they are encapsulated in a methyl cellulose matrix to protect them against reacting because of the alkali nature of the dry blend caused by the presence of the cement and the relatively small moisture content of the dry grout. Methyl cellulose is a non-alkaline sensitive material and does not form a film coating which adheres to the flakes. In this known practice, agglomerates or granules of encapsulated aluminum flakes are formed. Flakes on the outside periphery of the agglomerate are not adhered or protected by a coating and are lost.

When methyl cellulose is used to encapsulate the aluminum leafing type powder, the methyl cellulose is baked after the agglomerate is formed to drive out the solvent for the methyl cellulose. When the solvent is driven off, the methyl cellulose frequently forms a hard matrix about the encapsulated aluminum and it is difficult for the water of a wet grout to penetrate the methyl cellulose coating so that it can react properly with the aluminum flakes. To address this problem, the matrix has been made porous. See U.S. Pat. Nos. 3,579,366 and 3,709,707.

Agglomerates of aluminum flakes and methyl cellulose, are of a relatively large size (from about 300 microns to 1700 microns), each usually involving a relatively large number of flakes. This causes concentration of the aluminum in the grout at the discrete locations of the agglomerates and the failure to secure a sufficient distribution of the aluminum in the grout, i.e., a distribution substantially free of the aluminum concentrations mentioned. Accordingly, the agglomerates should be mechanically broken up when the dry grout is mixed with water to form a wet grout for pouring or pumping so that the necessary number of individual particles for the proper distribution of the aluminum flakes throughout the grout are present, as well as to facilitate penetration by the water of the wet grout into the particle to the aluminum. The necessity to breakup the agglomerates is a problem but also disadvantageously increases the mixing time for the wet grout.

When mixing the dry grout with water to form a wet grout, the agglomerates, if not broken up into smaller particles to provide the proper distribution of aluminum throughout the grout, will cause the aluminum in the wet grout to be too concentrated at the locations of the agglomerates and the aluminum will not properly function as an expanding agent. Proper dispersion involves the even distribution of the flakes throughout the grout so that the grout is substantially free of aluminum flake concentrations at locations in the grout. Accordingly, high speed propeller type mixers are recommended, and normally used, for mixing the dry grout with water to form the wet grout and to produce the proper aluminum flake distribution by breaking up the agglomerates of the given quantity of aluminum flakes to be dispersed so as to provide an increased number flake containing particles for a given quantity of aluminum to be dispersed to provide a proper dispersion without concentrations of the aluminum flakes. Those working in the art understood the necessity to break up the agglomerates and the manner of determining whether the agglomerates have been broken into a sufficeient number of particles to achieve the proper dispersion of the flakes in the grout having been accomplished and understood by those working in the art prior to the filing of my above identified application Ser. No. 018,226. The action of such mixers causes the abrasion during the mixing to aid the break up of the agglomerates to provide the proper aluminum dispersion and dissolution of the methyl cellulose prior to the pumping of the grout. It is appreciated by those in the art that when the agglomerates are mixed into the water of the wet grout and are broken up by the mixing, the aluminum flakes will start to react (i.e., gas) with the rate of reaction depending on the alkalinity of the wet grout, temperature, and the size of the aluminum flakes. Conventionally the reaction takes place over a period of 2 to 3 and sometimes 4 or 5 hours during the pumping and setting of the grout.

The relatively large size of the known agglomerates also presents problems when bags of the dry grout are sampled for testing to see if the constituents of the dry grout are within limits. In practice, the bags of dry grout are sampled at the construction location before mixing the dry grout to form a wet grout for pumping. The size of the presently used agglomerates limit the number locations in the dry grout for the aluminum content. The concentration of aluminum flakes in agglomerates results in a relatively limited number of agglomerates and makes it possible to obtain test samples from a bag that will not test within the required limits for the aluminum content even though the bag, as a whole, is within limits and would function properly when mixed properly to form a slurry.

In the known commercial practice of encapsulating aluminum flakes, methyl cellulose has been used as a coating and binder for the aluminum flakes because of its relative insensitivity to the alkali nature and moisture content of dry mix. Aluminum flakes which are commercially available will, as supplied, react in a dry grout blend including cement. While the flakes have a stearate coating for preventing oxidation of aluminum, the stearate coating applied to the aluminum flakes in commercial practice is not effective to protect the aluminum flakes against deterioration during the normal storing and shipping periods of a dry grout. It is believed that the primary reason for this is that the stearate coating is not durable enough to survive the dry grout blending operation which is abrasive because of the presence of cement, and perhaps other solids. However, it is questionable that the thin stearate coating of leafing flakes would survive the alkalinity and moisture of a packaged dry grout including cement even if the coating were not abraded by the blending operation.

In the practice one aspect of the invention, a film type coating which adheres to the aluminum flakes is used with the film having sufficient resistance to abrasion to survive normal dry grout blending with cement. The coating while having a limited sensitivity to the alkaline nature and moisture of the dry grout, has a high sensitivity to the alkaline water of the wet grout (the alkalinity being caused by the presence of cement) so as to cause the film coating on the aluminum flakes to break down (or dissolve) and expose the aluminum to the water of the wet grout to obtain the necessary reaction for the aluminum to function as an expanding agent. One such alkaline water sensitive coating and binder is water glass (sodium silicate). Other coatings and binders of simililar characteristics may be utilized. For example, the coating and/or binder may be neutral to an alkaline environment but highly soluble in water, if it has limited sensitivity to the moisture and alkalinity of the dry grout.

Accordingly, the aluminum used in the grout is coated with a film forming material, e.g., sodium silicate, which forms a film that coats and adheres to the aluminum with the coating being sensitive to the water and/or the alkaline nature of a wet grout but which also has a sufficiently limited sensitivity to the alkaline nature and moisture of dry grout including cement and the abrasive nature of the dry grout blending operation so that it is able to protect the aluminum flakes for commercially acceptable time periods for storage and/or shipping.

In a preferred embodiment for use with dry grout which is to be bagged and stored, the aluminum flakes, before being blended into dry grout materials, are film coated and adhered to small micro-particles, e.g., commercially available glassy silica microspheres, by use of a film forming coating and binder. However, it may be possible that the particles of finely divided aluminum may be individually provided with a proper film coating, e.g., during the manufacture of the aluminum and mixed into the dry grout without adhering them to another particle.

In accordance with the preferred embodiment utilizing micro-particles, aluminum flakes and small glassy micro-particles are coated with a film binder which also adheres the flakes to the small glassy particles. The size of the glassy particles is such that the coated glassy particles are sufficient in number for the required quantity of finely divided aluminum to provide a sufficient distribution of aluminum in the grout so that a significant releasing or breaking off, and disbursement of, the aluminum from the micro-particles by mechanical action or otherwise is not required for the proper functioning of the aluminum as an expanding agent for the grout. This necessarily includes a distribution of the aluminum flakes without concentrations of the flakes as mentioned in discussing the prior art. Preferably, the micro-particles have a maximum size of about 350 to 400 microns with the average size as determined by weight preferably being about 100 microns.

Tests have shown that the sodium silicate film coating for protecting the flakes will not be detrimentally affected by the dry grout blending or the alkalinity and moisture content of the dry grout for time periods commercially acceptable for the storage and shipping of the dry grout. While sodium silicate has been used as a coating, it will be appreciated that other coatings or binders which are sensitive to the water of the wet grout but have limited sensitivity to that of the moisture content and the alkalinity of the dry grout and are abrasion resistant to the blending with cementitious materials may be used. In practice, the smaller the average size of the micro-particles utilized, the greater the number of discrete aluminum coated particles involved for a given quantity of aluminum, and the more the number of distribution points for the aluminum up to a one to one correspondence of coated flake carrying microspheres and flakes, i.e. between the number of flakes and microspheres with one flake on each flake-carrying microparticle.

In tests, I have used a commercially available grade of glassy silica microspheres having particle sizes from about 10 to about 350 microns with about 20% of the particles having particle sizes of between about 125 and 350 microns and about 65% between about 50 and 125 microns. Other grades of micro particle may also be used to provide a sufficient number of individual coated particles for a given quantity of aluminum. The particle size used is not critical as long as a sufficient number of coated particles are present to provide the desired number of distribution points for the aluminum. However at the present I prefer a maximum size of 400 microns.

The aluminum flakes may be adhered to a micro-particle by the use of various conventional methods for coating microspheres or other small particles with metal particles or flakes. In the process which I have used, microspheres and the aluminum powder are dry blended to provide a uniform mix of the powder and microspheres, with the mix then being spread on a flat surface to form a thin layer. Droplets of a sodium silicate solution are then applied by dropping the droplets onto the whole of the entire layer to evenly spread the solution over the entire layer. The microspheres in the mixture are then rolled laterally in a mixing fashion to pick up and coat the flakes and adhere them to the microspheres. In the process of rolling, the water glass forms a film on the aluminum flakes and microspheres and the aluminum flakes become adhered to the microspheres. In coating the aluminum and adhering the aluminum to the microspheres, the microspheres do not tend to agglomerate but essentially retain their individual identity and the size and number of the microspheres as well as the film coating combine to limit the number of flakes which can adhere to an individual microsphere.

A preferred recipe for forming individual aluminum coated micro-spheres is as follows:

| Material | % by Wght. |
| --- | --- |
| Aluminum leafing powder Alcoa No. 322, 100 mesh polished | 3 |
| Hollow glass spheres size: 10–350 microns; particle size: 25% above 125 microns by weight, 65% between 49 and 126 microns by weight; bulk density: 25 lbs per cubic foot; average size by weight: 100 microns. | 83 |
| 40° Baumésodium silicate solution (50% water) | 14 |

The coated particles are prepared by the described method, baked briefly, e.g., for five minutes, at a temperature of about 130° F., and then air dried to complete the drying of the sodium silicate to set or harden the coating. This produces adherence of the flakes to the microspheres and a protective coating adhering to the flakes which fully covers any exposed surface of the flakes with the coating being such that it coating will survive both the dry blending of the flake-carrying microspheres with cement and the alkaline nature of the dry blend during storage.

I contemplate that the distribution of aluminum may also be accomplished by coating the aluminum flakes with a first alkaline water sensitive coating, and then adhering the coated aluminum flakes to micro-particles with another coating and/or binder which will readily disintegrate in the wet grout to release the aluminum flakes from the particles for further dispersion during the wet grout mixing and pumping operation or for a faster reaction in the wet grout. The binder adhering the coated flakes to the micro-particles may also be soluble or otherwise disintegrate in the presence of the mositure and/or the alkalinity of the cementitious dry grout so as to release the bond between the coated aluminum flakes and the micro-particles after being blended therewith. It will be appreciated that the binder for adhering the coated flakes to the micro-particles may deteriorate while in the dry mix without adverse results if the coating for the flakes is sufficient to protect the flakes from the moisture and alkalinity of dry grout with cement.

It will be further appreciated that the quantity of coated microspheres used for a given quantity of aluminum will depend on the number of aluminum flakes which are adhered to the individual microsphere. The number of flakes on a particle is, in turn, dependent on the size of the micro-particle. If the number of coated micro-particles is determined to be too few to provide the desired number of distribution points, a finer grade of particles may be used in the coating process.

Conventionally in the art of grouting, a fluidifier (which is an admixture of grout enhancing materials) is utilized in the grout recipe and contains the coated aluminum flakes as a component thereof. The admixture will normally constitute, for example, about one percent by weight of the cementitious material in the dry grout. A typical wet grout may contain, by weight (lbs.),

| | |
| --- | --- |
| Cement | 282 |
| Fly Ash | 70 |
| Sand | 360 |
| Water | 167 |
| Fluidifier | 3.52 |

The quantity of coated micro-particles needed to provide the necessary aluminum content may be conventionally determined by reacting a given unit quantity of coated micro-particles in an alkaline grout slurry and measuring the gas produced. Knowing this, one of ordinary skill in the art may determine the quantity of coated microsphere units necessary to produce the total gas volume required for the grout.

A simple method of determining the total gas volume required is to mix the quantity of aluminum flakes required for effecting the desired expansion in a test cylinder for a sample of the grout into a solution of sodium hydroxide and measure the gas volume released to determine the gas generated for the unit quantity. Knowing this, the total gas volume for the whole quantity of aluminum to be used can be readily computed as well as the necessary quantity of coated microspheres to produce the total gas quantity since the gas volume for a unit quantity of the coated microspheres has been determined, or is determinable, as described above.

Whether there is a sufficient number of particles for the aluminum to effect the proper distribution of the aluminum can be determined, as is appreciated by those in the art, by examination of a sample of hard grout made from a test batch of the dry grout. If a wider distribution is necessary, this can be accomplished by using a finer grade of coated micro-particles which will have, on the average, a lesser number of aluminum flakes on the micro-particles, on the average. If more or less aluminum is required, the number of coated particles can be increased or decreased to adjust the aluminum content.

One of ordinary skill in the pertinent art, from the above description of the invention and of the preferred embodiments, may readily determine when there are sufficient flake carrying microparticles to effect the distribution of the aluminum to achieve the proper action of the aluminum in expanding the grout. For example: Those of ordinary skill in the art know how to determine the quantity of aluminum flakes to be used in a grout recipe to provide the desired expansion. Conventionally this may be determined by preparing a laboratory sample of the grout with an approximated amount of aluminum flakes, e.g., under a known guideline of about one teaspoon of aluminum per bag of cement (94 lbs.), measuring the expansion of the sample wet grout, and adjusting the aluminum flakes if necessary on a trial and error basis until the desired expansion is achieved for that recipe. The industry presently has conventional grout recipes which use aluminum flakes and these can also be used as the guidelines for the quantity of aluminum flakes to be carried by the microspheres. As indicated in the foregoing part of this specification, the microspheres should be of a grade having a maximum size of about 350 to 400 microns preferably with an average size by weight of about 100 microns. Moreover, for hollow microspheres of the preferred recipe, the weight of the hollow microspheres is about 28 (83/3) times the aluminum flakes. It is within the ordinary skill in the art to adjust for heavier or lighter microparticles than the hollow microspheres of the preferred embodiment. As described, the microparticles are first preblended with the aluminum flakes and the binder then applied to coat and adhere the flakes to the microspheres. Also as described above, after the coated flake carrying microspheres are dried, the gas generated by a unit quantity of the microspheres can be determined and compared with that from a unit quantity of aluminum flakes to ascertain the equivalent quantity of coated flake carrying microspheres to be used in a grout mix in place of the conventional aluminum flake expansion agent. As is conventional, test samples of the grout recipe with the flake carrying microspheres may then be made, cross sectioned, and inspected, in accordance with the conventional practice, to see if the aluminum flakes are too concentrated in some areas. This is usually revealed, as is known to those in the art, by relatively large pockets in the faces of the cross-section which may be seen with the naked eye or with a hand glass. If such pockets are present, this indicates that the number of microparticles for the same quantity of the aluminum flakes is to be increased and one working in the art would understand from the foregoing specification to blend a larger quantity of microspheres with the same quantity of aluminum flakes. This may be done by adding more of the same grade size microspheres to reduce the flakes on a single particle or changing the grade size to a smaller size. Known petrographic techniques are also conventionally used in the examination of grout cross-sections and are available to determine if the proper number of flake carrying microspheres have been used to effect proper distribution of the flakes. On magnified examination, as is well understood in the art, the voids should be evenly distributed throughout the hardened grout and without pockets (relatively large voids), which concentrations of aluminum will cause. In practice, test grouts with and without the aluminum flakes can be made for comparison to clearly identify pockets cause by concentrations of the aluminum flakes in order to determine if the aluminum flakes are being carried by a sufficient number of microspheres. Such techniques for determining aluminum flake distribution have long been known in the art and are conventional.

I have found that the present invention is useful in certain applications apart from blending with dry grout to be packaged and stored. In certain applications for example when pumping neat grout, i.e., a cement slurry with no aggregate, particularly at high ambient temperatures where the pumped grout must be iced down, to mix the water, cement, and fluidifier at the location of pumping. Aluminum flakes attached to microspheres are useful in providing an expansion agent as part of the fluidifier admixture. However, in the case of neat cement the sodium silicate solution describe about should be modified to be a 10% solution of sodium silicate to reduce the density of the sodium silicate in the coating for protecting and adhering the flakes to the microspheres.

An illustrative recipe which has been used for such flake coated microspheres with the microspheres being hollow microspheres under 400 microns and having an average of about 100 microns, is as follows:

| Microspheres | 10 lbs. |
| Aluminum leafing flakes | 6 oz. |
| Sodium silicate (10% solution) | 1 lb. |

In preparing such flake coated microspheres the microspheres and aluminum flakes were first dry blended in a large Hobart mixture at a slow speed, and then the sodium silicate solution added over a period of about 30 seconds, after which the mixer operated at a somewhat higher speed for another minute. The contents were then spread for drying to harden the sodium silicate coatings. The contents may be rough screened to break apart any individual flake coated microspheres which are sticking to each other. A Hobart mixer has a rotating mining head which orbits about the center of the mixing bowl.

A neat cement has been pumped at high temperatures with a fluidifier containing flake coated glassy hollow microspheres (10 per cent sodium silicate water solution) with the reaction of the flakes in the grout to occur in a temperature window of 85 to 90 degrees Fahrenheit. The fluidifier included the described flake carrying microspheres, limestone dust, fly ash, and a high range water reducer and retardant. The fluidifier recipe was dry blended prior to the adding to the slurry water. As in the conventional practice, the cement and fluidifier were added to the slurry water in sequence while mixing with the slurry water. The following is the fluidifier recipe used and which constituted essentially 1% of the cement used in the grout.

| No. 5 limestone dust | 800 lbs |
| No. 10 fly ash | 350 lbs |
| Borem RD 1 | 200 lbs |
| Coated aluminum flake microspheres | 230 lbs |

Borem RD 1 is a known brank, commercially available, high range water reducer and retarder which functions as plasticizer and dispersant. The limestone dust and fly ash are fillers and carriers which aid in the dispersing of the components of the slurry through out the slurry as is understood in the art. The weight of these latter components of the fluidifier can be adjusted to compensate for changes in weight in the flake carrying microspheres, for example, to increase or decrease the expansion or because of the use of different weight microspheres to carry the particles, to maintain the fluidifier at essentially 1% of the weight of the cement used while providing the necessary number of flake carrying particles to effect an even distribution of the aluminum flakes thereon throughout the grout slurry to avoid pocket or void forming concentrations of the aluminum flakes.

In the foregoing fluidifier, one pound of flake coated microspheres carried 15.2 grams of aluminum leafing flakes and were coated with the 10% sodium silicate water solution. It is noted that the sodium silicate coating is such as to survive the dry blending of the fluidifier which is not as abrasive as when blending dry grout.

While hollow glassy microspheres are used in the preferred embodiments other microparticles compatible with cementitious grout may be utilized such as expanded perlite fines. Such fines have sizes under 200 mesh including sizes suitable for use with the present invention.

What I claim is:

1. A method of providing an alkaline neat cementitious wet grout slurry at a job site in an elevated ambient temperature environment, said method comprising the steps of providing at the job site: (1) water for forming a wet grout slurry, (2) cement, and (3) a blended fluidifier composition, the fluidifier being a blended composition which includes a high range water reducer as a retarder, particles functioning as dispersants, and aluminum flakes adhered to microspheres for distributing the aluminum flakes evenly throughout the grout slurry, the flakes having a protective coating thereon which adheres the flakes to the microspheres and which survives mixing of the fluidifier composition into the cement slurry and which reacts to the alkalinity of the grout to effectively expand the grout on placement, the fluidifier having a weight which is about 1% of the cement in the slurry, and mixing the cement and fluidifier in sequence into the slurry water to form the wet grout slurry and distribute the fluidifier evenly throughout the wet grout substantially free of aluminum concentration, and pumping the wet grout slurry under elevated ambient temperature conditions to place the grout slurry.

2. A method as defined in claim 1 in which the aluminum flakes are adhered and coated with a sodium silicate coating formed from a 10% water solution of sodium silicate.

* * * * *